United States Patent [19]
Gareau et al.

[11] Patent Number: 5,964,356
[45] Date of Patent: Oct. 12, 1999

[54] MODULAR STORAGE RACK FOR COMPACT DISCS AND THE LIKE DATA MEDIA

[76] Inventors: David Gareau, 109, rue Denault, Kirkland, Quebec, Canada, H9J 3X4; Sylvain Bouchard, 3638, rue Adam, Montreal, Quebec, Canada, H1W 1Y9

[21] Appl. No.: 08/840,309

[22] Filed: Apr. 11, 1997

[51] Int. Cl.[6] .................................................. A47G 29/00
[52] U.S. Cl. ........................ 211/40; 211/41.12; 211/168
[58] Field of Search ...................... 211/40, 13.1, 41.12, 211/165, 168, 169

[56] References Cited

U.S. PATENT DOCUMENTS

| | | |
|---|---|---|
| 3,812,975 | 5/1974 | Gutierez . |
| 4,161,019 | 7/1979 | Pierce et al. . |
| 4,630,737 | 12/1986 | King .......................................... 211/40 |
| 4,651,882 | 3/1987 | Wright et al. ............................. 211/40 |
| 4,892,189 | 1/1990 | Kunimune et al. . |
| 5,040,689 | 8/1991 | Whittington . |
| 5,180,058 | 1/1993 | Hu . |
| 5,201,414 | 4/1993 | Kaszubinski ........................... 211/40 X |
| 5,267,659 | 12/1993 | Fickling et al. . |
| 5,275,367 | 1/1994 | Frye . |
| 5,344,028 | 9/1994 | Angele . |
| 5,439,119 | 8/1995 | Chow . |
| 5,495,953 | 3/1996 | Bearth . |
| 5,518,112 | 5/1996 | Ono et al. . |

Primary Examiner—Daniel P. Stodola

[57] ABSTRACT

A series of add-on modular clips are serially hinged to one another to hold the disc containing cases in staggered position for storage. The face of any selected disc can be accessed for easy identification and disc retrieval by opening the cover of the selected disc case without removing the case from the clip. Each clip has a resilient unitary U-shaped member with legs of unequal width and of a shape for easy case insertion. A double clip member is also provided to hold two series of single clips, the clips of each series progressively more spaced to permit case opening of any selected disc of one stack of cases without interference from the other stack of cases.

24 Claims, 6 Drawing Sheets

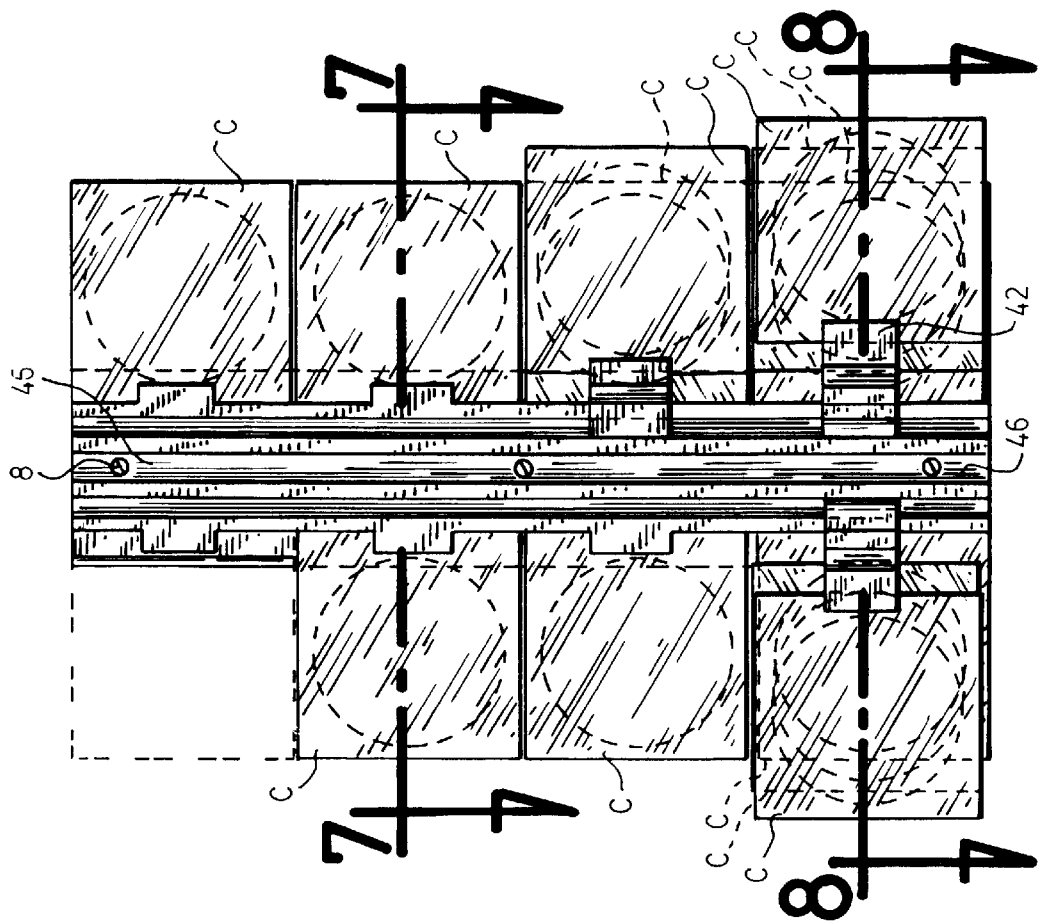
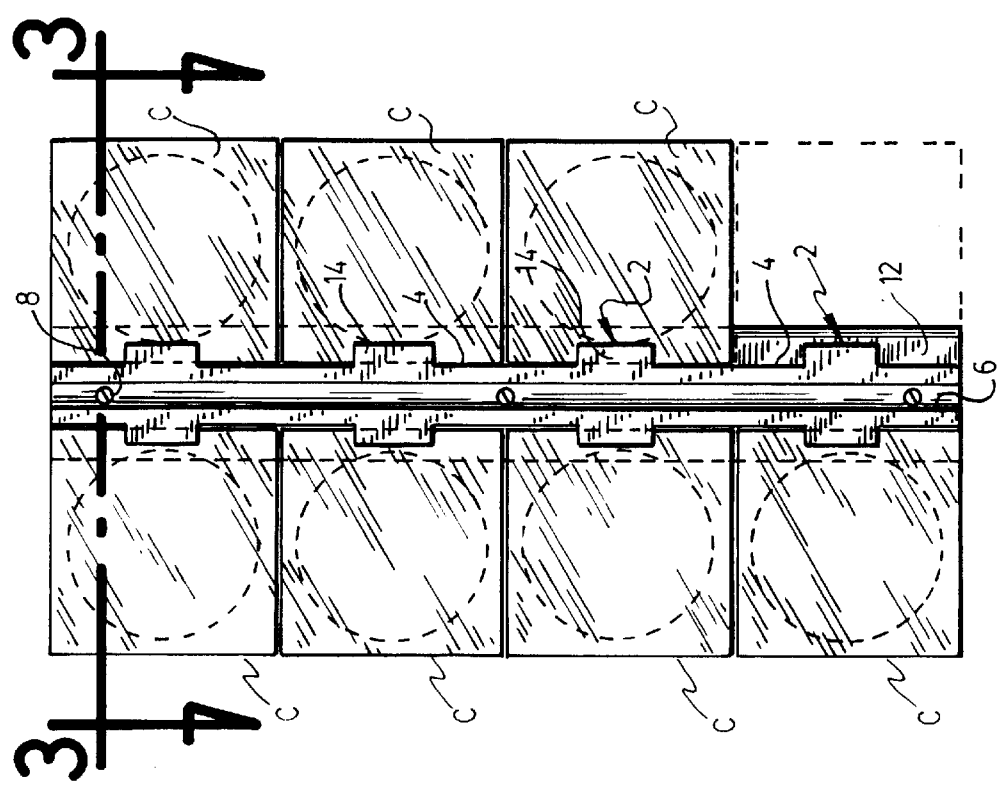
Fig.1
Fig.2

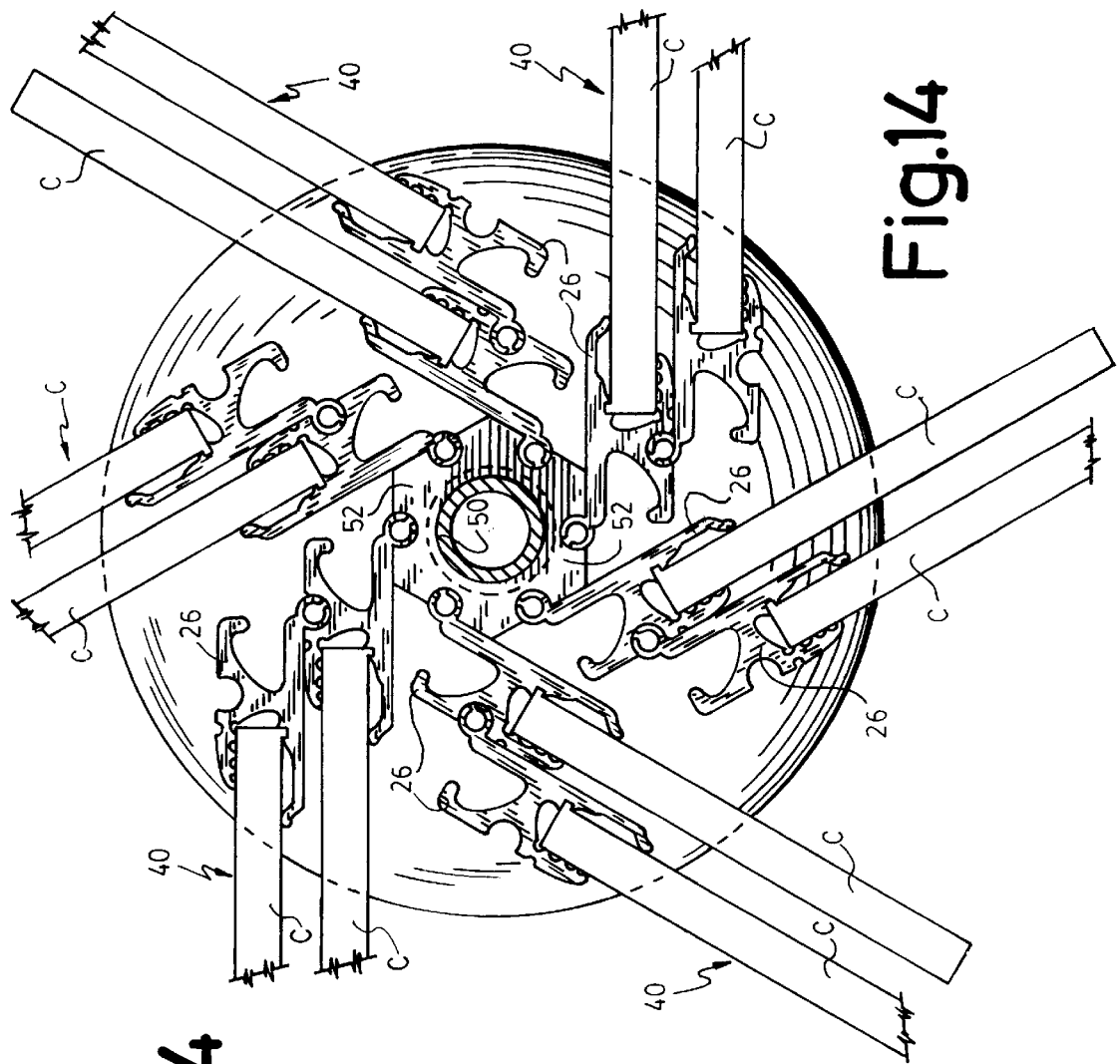
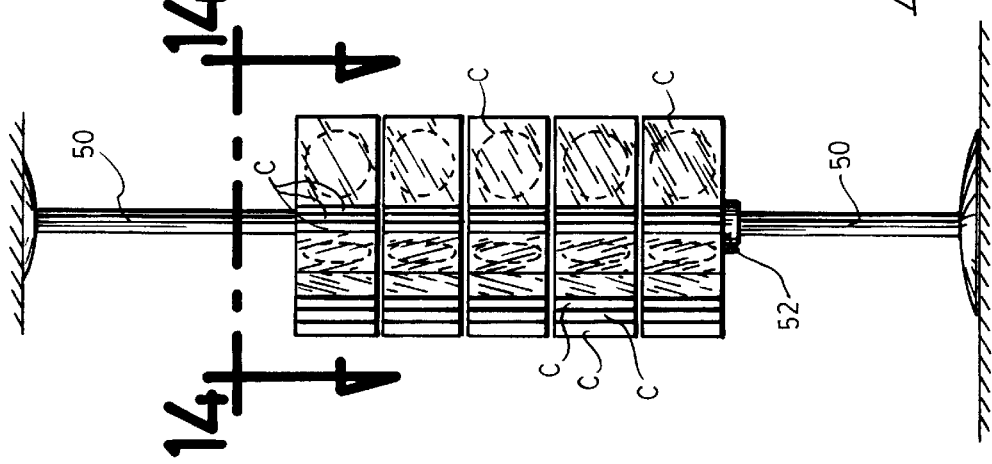

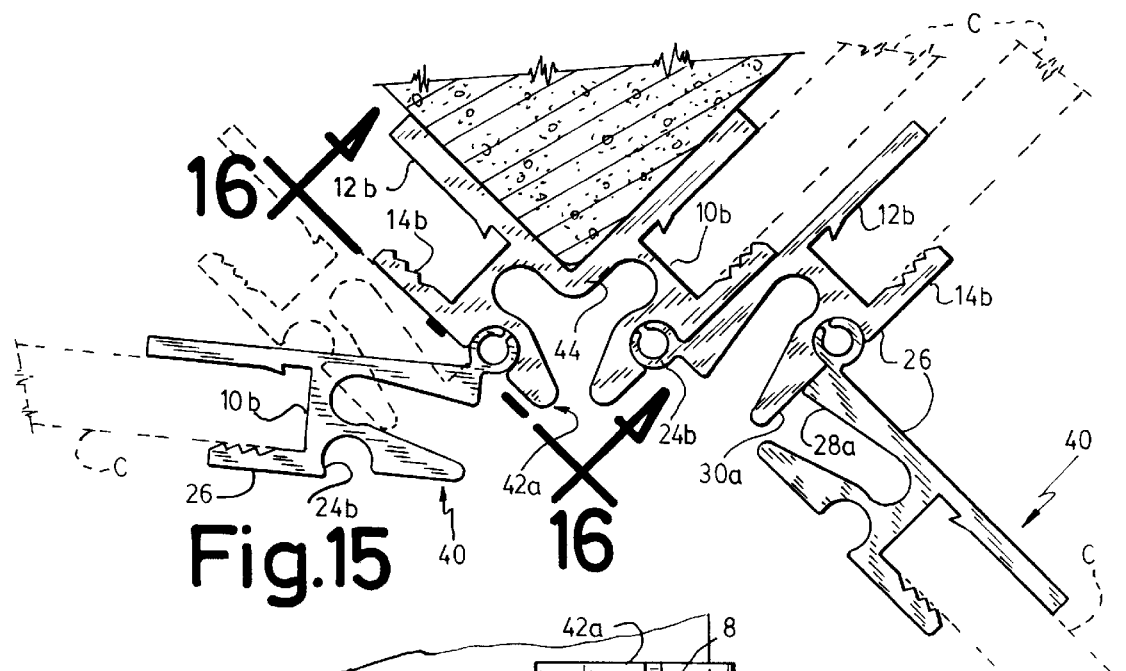
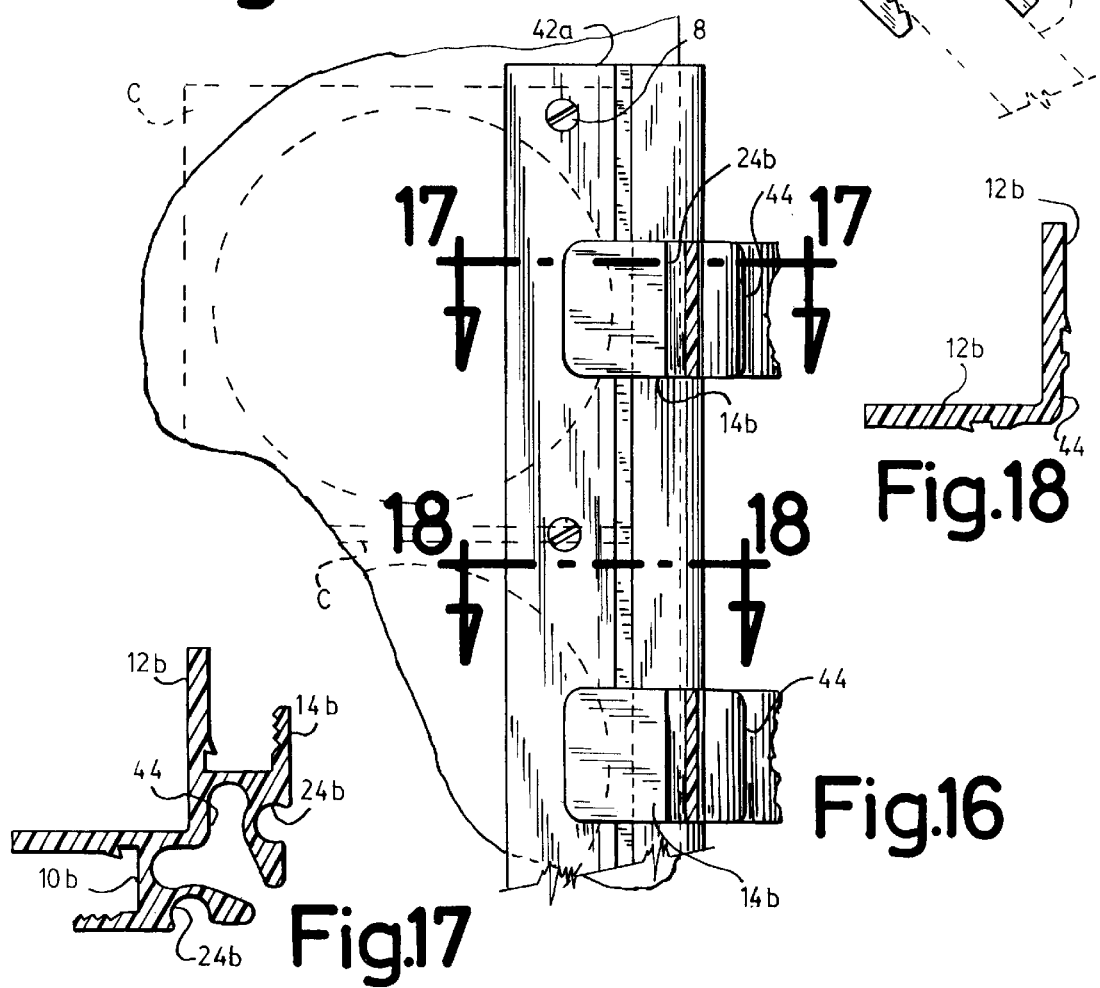

5,964,356

MODULAR STORAGE RACK FOR COMPACT DISCS AND THE LIKE DATA MEDIA

FIELD OF THE INVENTION

The present invention relates to a storage apparatus for storing stacks of data media containing cases such as cases containing compact discs and the like.

BACKGROUND OF THE INVENTION

Several types of storage devices for the above-mentioned purpose are already known. In most devices only an edge face of the case is visible for identification when the cases are in stacked condition and a difficult manipulation of the case containing the selected discs must be accomplished to permit case opening and disc retrieval. Such is the case for instance in U.S. Pat. No. 5,344,028 dated Sep. 6, 1994, entitled "Storage for data media particularly compact discs", inventor, Boris Angele.

OBJECT OF THE INVENTION

It is an object of the present invention to provide a modular storage apparatus of the kind described which obviates the above noticed disadvantages and more particularly in which at least part of the main face of the case is visible while the discs are in a stored condition and in which a selected disc may be retrieved by a minimum manipulation of the stack of discs.

Another object of the present invention is to provide an apparatus of the character described which is of a very simple construction, consisting of a minimum number of different parts which can be made of plastic and extruded or by injection.

Another object of the present invention is to provide an apparatus of the character described in which several stacks of discs containing cases can be arranged side by side and yet each stack can be opened for retrieval of a selected disc.

Another object of the invention is to provide an apparatus of the character described which may be installed on a vertical support surface such as a wall or a post or a horizontal support surface such as a car roof, shelves, desktops or the like.

SUMMARY OF THE INVENTION

The storage apparatus of the invention comprises a series of similar clips, each clip defining a holding plane and capable of releasably holding in the holding plane one case of the stack from an edge of the case, each clip carrying a pair of complementary hinge members by means of which the clips are serially hinged together for pivotal movement of any selected clip relative to a preceding clip of the series between a folded position in which the selected clip holding plane is parallel with the preceding clip holding plane and an open position in which both holding planes make an angle, the pivotal axes of the complementary hinge members on any one clip being offset in the direction of the holding plane.

Preferably each clip forms an abutment against which the following clip of the series abuts when pivoted to its open position, normally at an angle of 90 degree relative to the folded position.

Preferably each clip has two opposite spaced parallel main faces and the pair of complementary hinge members are respectively located at the opposite main faces.

Preferably the pair of complementary hinge members includes a cylindrical male hinge member protruding from one main face and a female hinge member formed by a partially cylindrical groove in the opposite main face, the complementary hinge members being releasably interconnected.

Preferably each clip has a portion of a U-shaped cross section defining a web and pair of legs spaced a distance corresponding to the depth of a case, one leg being wider than the other leg, the wider leg having an inner transverse groove adjacent the web for receiving an edge rib of a case held in the clip, the wider leg defining an inturned case-engaging lip at its free edge.

Preferably each clip forms an abutment against which the following clip of the series abuts when pivoted to its open position.

Preferably each clip forms a second pair of legs respectively substantially coplanar with the first pair of legs and protruding from the web away from the first pair of legs, the leg of the second pair which is coplanar with the narrower leg of the first pair forming the abutment.

Preferably the two sets of coplanar legs form opposite spaced and parallel main faces of the clip, the complementary hinge members being respectively located at the opposite main faces.

Preferably a base member having two spaced, parallel complementary hinge members to which the complementary hinge member of the first clip of two series of such clips is releasably hinged, the pivotal axes of the complementary hinge members of the clips of both series being progressively distant from each other for clips progressively distant from the base member.

Preferbly the base member forms a clip capable of releasably holding a case in a holding plane parallel to the holding planes of the clips of the series when the clips are in folded position.

Preferably the base member forms two oppositely facing interconnected clips, each interconnected clip capable of releasably holding a case in a holding plane parallel to the holding planes of the clips of one of the two series when the clips are in folded position, each interconnected clip having two legs, one leg wider than the other leg.

Preferably the base member has the holding planes and wider legs of the interconnected clips are respectively coplanar.

Preferably the base member has the holding planes and wider legs of the interconnected clips are respectively normal to each other.

Preferably the base member clip further includes a connector, the connector and each one of a pair of such base members having spaced, parallel, complementary hinge members by means of which the connector releasably connect the pair of base members.

Preferably the invention includes a strip integrally forming several base members, spaced from one another and with their complementary hinge members being coaxial.

BRIEF DESCRIPTION OF THE DRAWINGS

In the annexed drawings,

FIG. 1 is a bottom plan view of a first embodiment of the storage apparatus;

FIG. 2 is a bottom plan view of a second embodiment;

FIG. 6 also shows a pivoted single clip from another stack behind the illustrated stack;

FIG. 13 is an elevation of another embodiment of the storage apparatus of the invention;

FIG. 14 is a plan section taken along line 14—14 of FIG. 13;

FIG. 15 is a view similar to FIG. 7 but with a modified double clip provided with two pivot means for attaching two stacks of single clips normal to each other;

FIG. 16 is a view along line 16—16 of FIG. 15;

FIG. 17 is a view along line 17—17 of FIG. 16; and,

FIG. 18 is a view along line 18—18 of FIG. 16.

DETAILED DESCRIPTION OF THE PREFERRED EMBODIMENT

Referring to FIGS. 1, 2, 3 and 4, a series of double base clips 2 are interconnected in end to end relation by intermediate portions 4 to form a strip 6 which can be secured to a support surface by anchoring screws 8.

Figure 3:
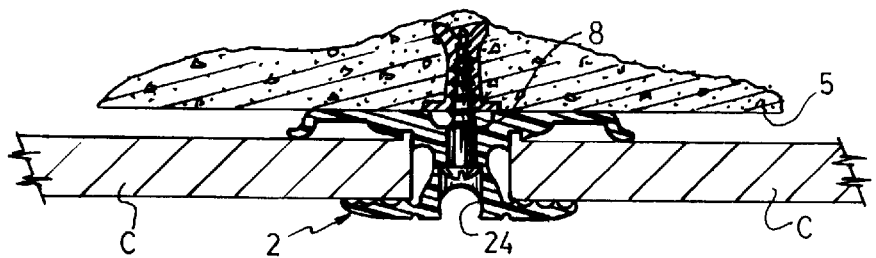
FIG. 3 is a cross section taken along line 3—3 of FIG. 1.
Figure 4:
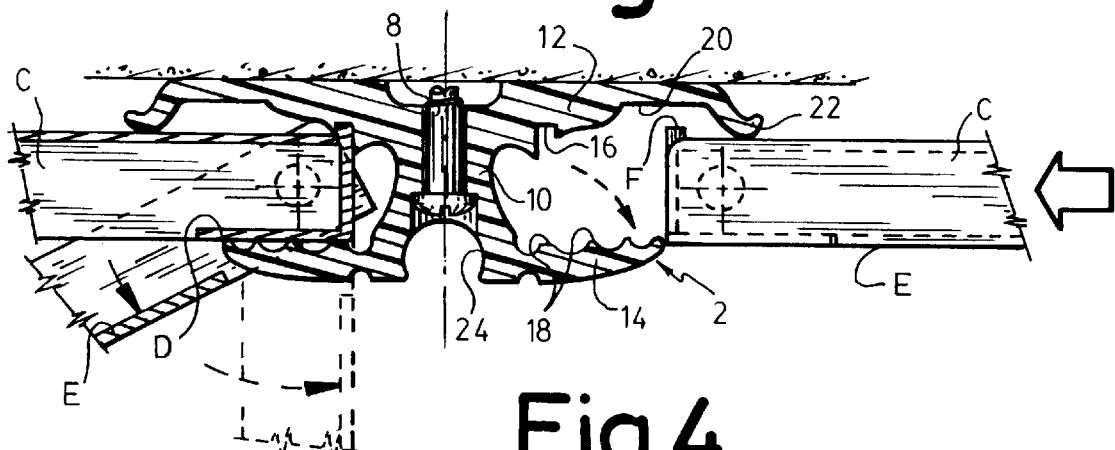
FIG. 4 is a view similar to FIG. 3 showing how a disc case is opened.
Figure 5:
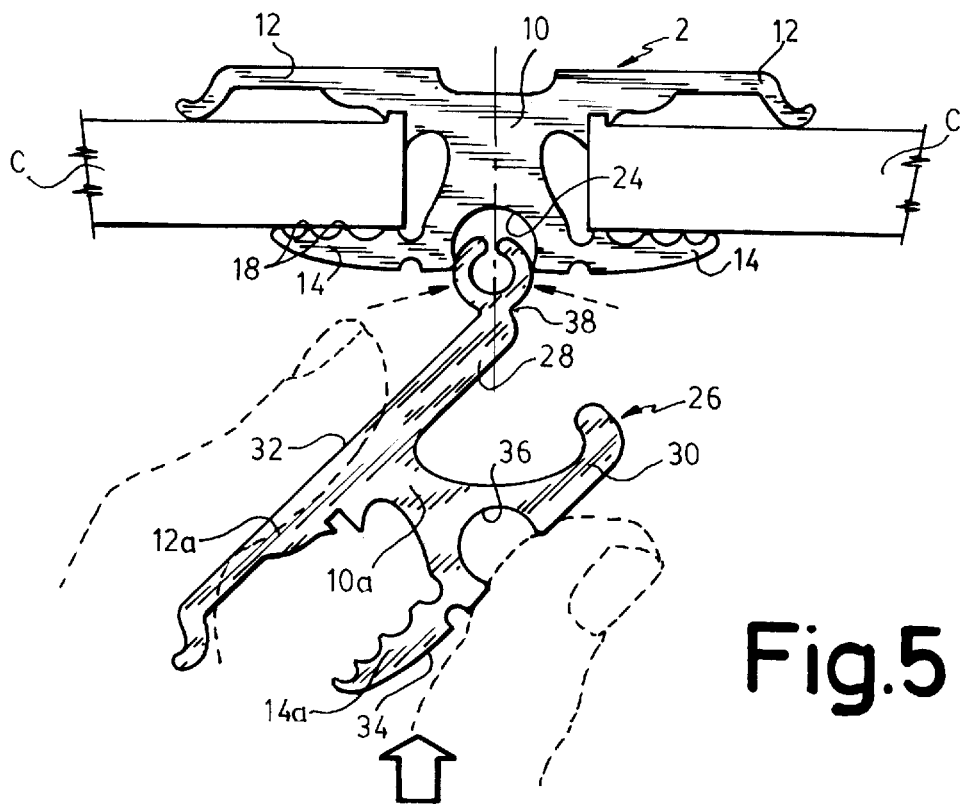
FIG. 5 is a view similar to that of FIG. 3 but seen in side elevation and showing how an add-on single clip can be hinged to the double clip of FIG. 3.

Double clip 2 holds in coplanar position, two oppositely directed compact disc cases. The cross sectional shape of the double base clip 2 as shown in FIGS. 3 and 4. Each clip has a U-shape defining a common web 10 and two legs spaced a distance in accordance with the depth of case C. Each clip portion includes a wider leg 12 and a narrower leg 14.

As shown in FIG. 1, the narrower leg 14 is much shorter than the width of the disc case C and is narrow enough to extend short of the standard overlying flange D of case C so as to permit opening and closing of the case cover E without having to retrieve case C from the clip 2 as shown at the left of FIG. 4. Case C is normally provided with a transverse rib F which engages a transverse groove 16 made at the inner surface of the wider leg 12, adjacent common web 10. This groove 16, together with inner teeth 18 formed at the inner surface of the narrower leg 14, positively maintain the case C in clipped position.

Case insertion into the clip portion is facilitated by the provision of a recess 20 formed at the innerface of wider leg 12 and by an outer inturned lip 22. Case C clipping is effected as shown in FIG. 4 by actual pushing of the case against the rounded edge of the narrower leg 14 or better by inclining the case so as to open up the resilient narrower leg 14. Case insertion is facilitated by the provision of the recess 20.

The common outer surface of the two wider legs 12 is in contact of the support surface S while the opposite surface has a partly cylindrical groove 24 which extends the entire length of strip 6 and forms a female hinge member for releasably hinging several modular single clips 26 along the entire length of the strip 6. Each single clip 26 is of a length corresponding to the narrower leg 14 as shown in FIG. 1.

Each single clip 26 has a clip portion of the same cross-sectional shape as the two clip portions of double base clip 2, namely a common web 10a, a wider leg 12a and a narrower leg 14a. Wider leg 12a has a wider leg extension 28 while narrower leg 14a has a narrower leg extension 30. Each clip 26 has two spaced opposite main surfaces, namely wider surface 32 and narrower surface 34. Narrower surface 34 is formed with a transverse groove 36 of partly cylindrical shape and constituting a complementary female hinge member. This groove 36 is of the same cross sectional shape as groove 24 of double base clip 2. Wider leg extension 28 is provided at its outer end with a complementary male hinge member 38 of cylindrical shape and longitudinally split. Male hinge member 38 can be removably inserted within female hinge member 24 of double base clip 2 or within female hinge member 36 of any one single clip 26. It is noted referring to FIGS. 6 and 8 that the male hinge member 38 of any one single clip 26 is laterally offset with respect to female hinge member 36 of the same single clip 26 in the direction of the plane in which case C is held by clip 26.

Figure 6:
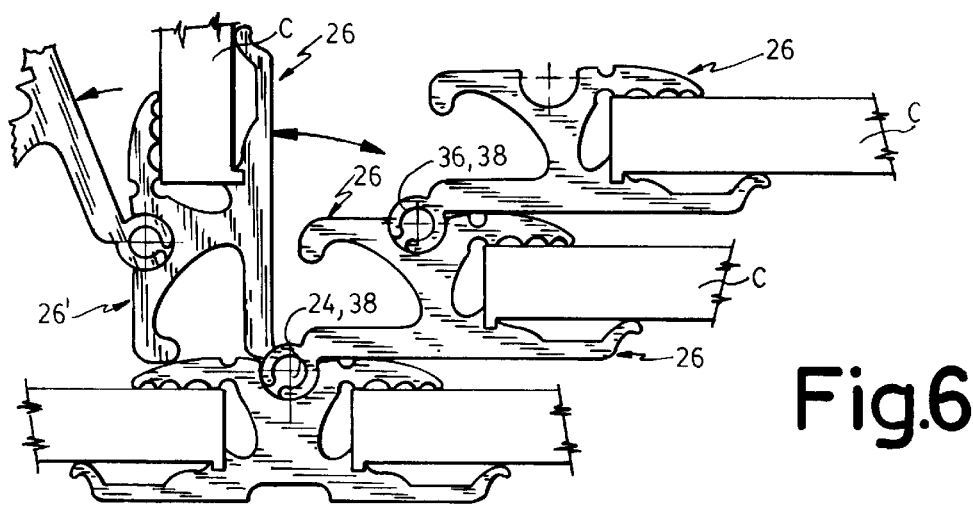
FIG. 6 shows the double base clip of FIG. 5 in a reversed position and to which a series of hinged single clips have been attached.
Figure 8:
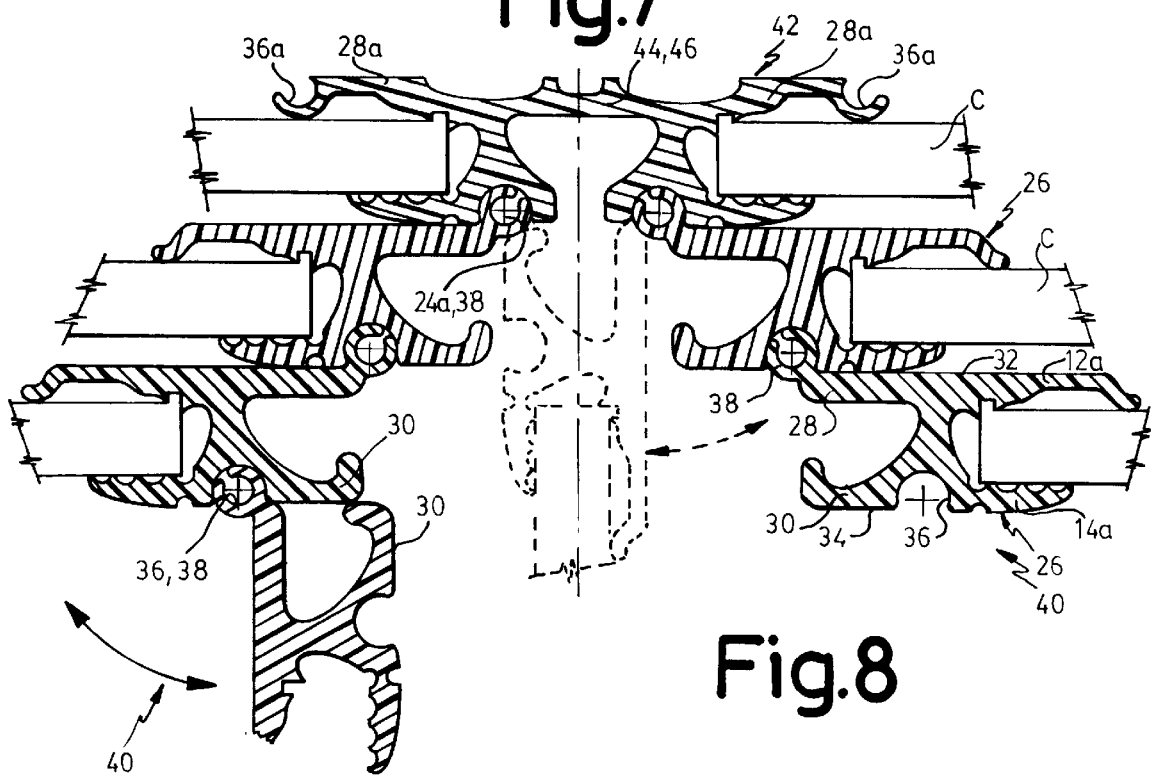
FIG. 8 is a view similar to FIG. 7 but to which two stacks of single clips have been attached and showing how a selected single clip can be pivoted for retrieval of a disc.

FIGS. 6 and 8 show that one can form a staggered stack 40 (see FIG. 8) of compact discs containing cases C each held in a single clip 26 and with all the clips serially hinged to one another. Stack 40 can be opened up like the pages of a book by pivoting any selected clip 26 between a folded position in which the surface 32 on one clip abuts against the surface 34 of the next preceding clip of the stack 40 to an open position, at a substantially right angle to the folded position, in which the edge of the narrower leg extension 30 abuts against the narrower leg extension of the next preceding clip (see FIG. 8), this narrower leg extension forming an abutment for the succeeding clip.

Obviously, this abutment is constituted by the narrower leg 14 with respect to the double base clip 2 as shown in FIG. 6 wherein at the left hand side of the figure there is shown a single clip 26 which has been pivoted to open position this clip 26 belonging to a stack of cases axially behind the stack 40.

Figure 7:
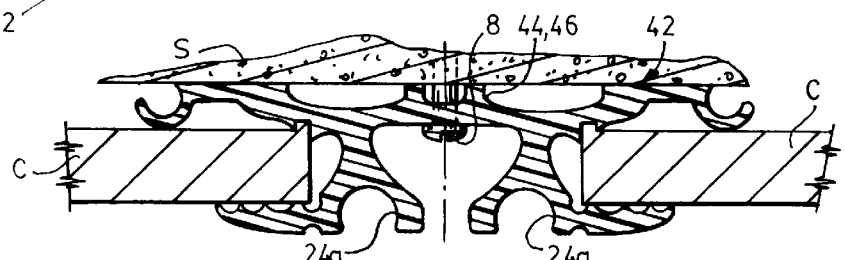
FIG. 7 is a cross section of a modified double clip provided with two pivot means for attaching two coplanar stacks of single clips.

FIGS. 7 and 8 show a double base clip 42 in which two opposite, spaced apart clip portions are connected by common web 44; each clip portion consists of a web 10a, a wider leg 12a and a narrower leg 14a. Each clip portion has a groove 24a female hinge member. Two series of single clips 26 are releasably hinged to double clip 44 with successive clipped cases C progressively more distant from coplanar cases C of the other stack 40 so that opening of one stack can be effected without interference from the clips and cases of the other stack.

Therefore the case containing the selected disc can be pivoted through approximately 90 degrees and its cover open for disc retrieval. The case remains in clipped position. As in the first embodiment the double base clip 42 is preferably part of a strip 46 as shown in FIG. 2 wherein successive hinges 36, 38 are co-axial. This strip 46, which is analogous to strip 6 of FIG. 1, can be secured to any supporting surface as in the first embodiment.

Figure 9:
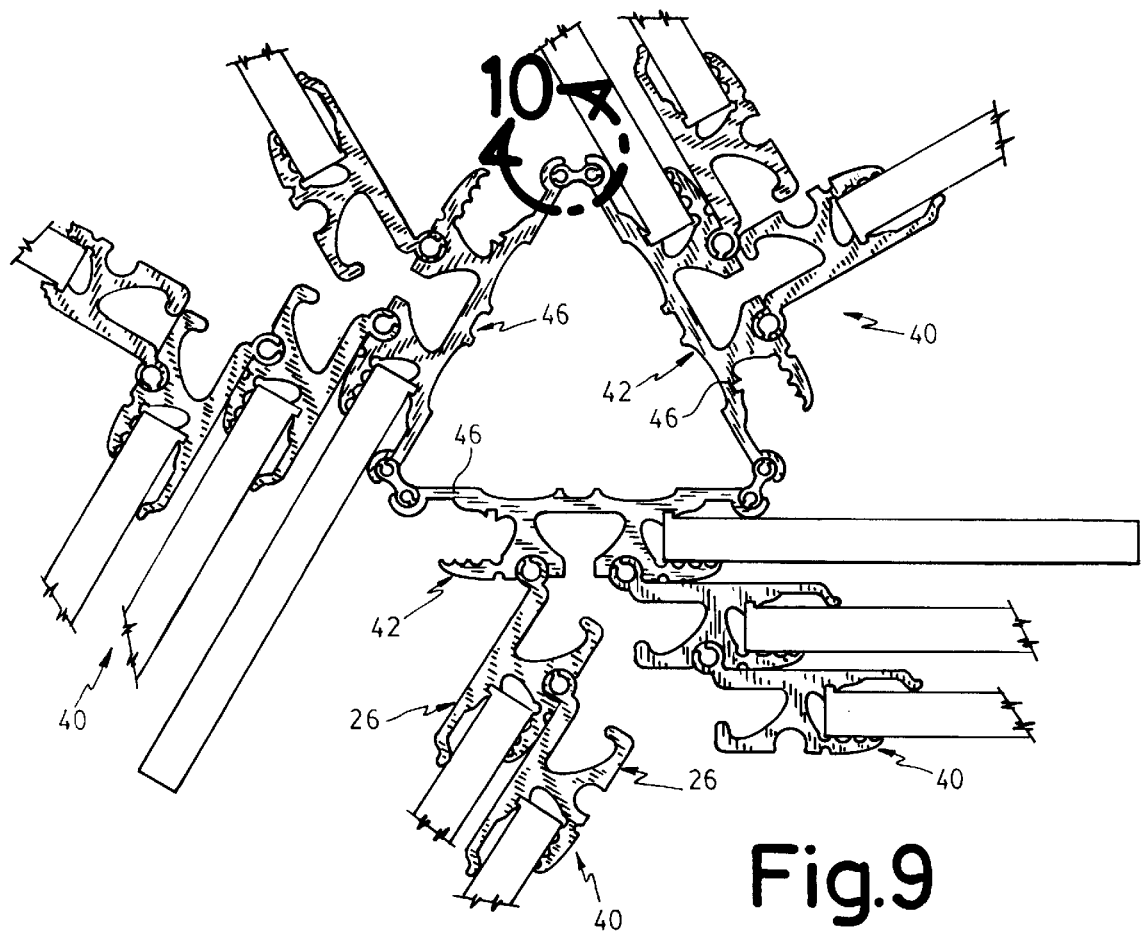
FIG. 9 shows, in top plan view, a column of three interconnected double clips as in FIG. 7 each supporting two stacks of single clips.
Figure 10:
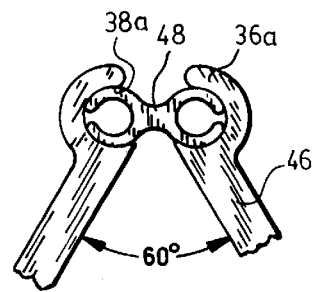
FIG. 10 is a partial view of the connector for two double base clips and taken in area 10 of FIG. 9.
Figure 12:
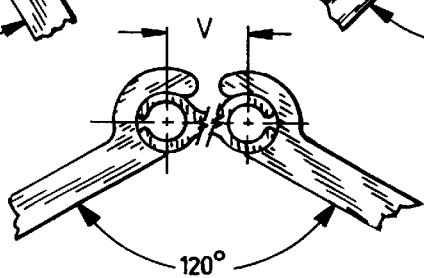
FIGS. 11 and 12 show how the connectors allow adjustment of the angle made between two double base clips.
Figure 11:
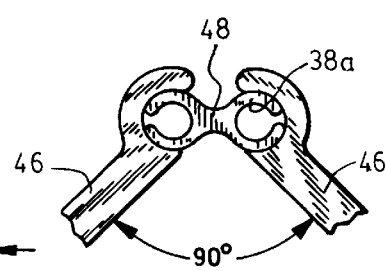

Double base clip 42 of FIG. 8 is also characterized by the fact that the free ends of its wider leg extensions 28a form complementary female hinge members 36a for connection of two adjacent double clips 42 as shown in FIG. 9. This is effected by the provision of a connector 48 formed with a pair of male hinge members 38a as shown in FIGS. 10 to 12. The length of each connector 48 is variable and also each connector can connect to adjacent double clips 42 at a variable angle. Consequently an assembly of a variable number of strips 46 of double clips 42 can be formed to constitute a tower of different geometrical shapes which can be held in a vertical position by a means not shown.

The tower of FIG. 9 has three sides each holding two diverging rows of end-to-end stacks of cases 40, each row corresponding to the length of each strip 46. Yet any case C of the assembly can be selected and opened up without interfering with the cases of the adjacent stacks.

Referring to FIGS. 13 and 14: there is shown a post 50 extending between the floor and the ceiling surrounded by a sleeve 52 of hexagonal cross sectional shape, each side of which is formed with a central groove forming a female hinge member 36. Each groove 36 receives the male hinge members 38 of a number of axially hinged single clips 26 for holding several cases C in coplanar relationship vertically along the post. Several clips 26 are serially hinged to one another to form a stack of cases and any selected case can be opened up for disc retrieval without interference from an adjacent stack of cases.

FIGS. 15, 16, 17 and 18 show an alternative double base clip 42a in which two opposite, spaced apart clip portions are connected by common web 44; each clip portion consists of a web 10b, a wider leg 12b and a narrower leg 14b. Each clip portion has a groove 24b female hinge member. Two series of single clips 26 are releasably hinged to double clip 42a with successive clipped cases C progressively more distant from cases C of the other stack 40, the two stacks 40 are normal to each other so as to form two stacks 40 on two walls normal to each other. In this embodiment, in the open position, at a substantially right angle to the folded position, the edge of the wider leg extension 28a abuts against the narrower leg extension 30a of the next preceding clip (see FIG. 15), this narrower leg extension forming an abutment for the succeeding clip.

We claim:

1. A storage apparatus for storing a stack of data media containing cases comprising a series of similar clips, each clip defining a holding plane and capable of releasably holding in said holding plane one case of the stack from an edge of the case, each clip carrying a pair of complementary male and female hinge members by means of which the female hinge member of one clip can receive the male hinge member of an adjacent clip such that said clips are serially hinged together for pivotal movement of any selected clip relative to a preceding clip of the series between a folded position in which said selected clip holding plane is parallel with said preceding clip holding plane and an open position in which both holding planes make an angle, the pivotal axes of said complementary male and female hinge members on any one clip being parallel to each other but offset relative to each other in the direction of said holding plane, each clip having two opposite spaced main faces, said male hinge member being cylindrical and protruding from one main face, said female hinge member being a partially cylindrical groove in the opposite main face.

2. A storage apparatus as defined in claim 1 wherein each clip has a portion of a U-shaped cross section defining a web and pair of legs spaced a distance corresponding to the depth of a case, one leg being wider than the other leg, said wider leg having an inner transverse groove adjacent said web for receiving an edge rib of a case held in said clip, said wider leg defining an inturned case-engaging lip at its free edge.

3. A storage apparatus as defined in claim 2 wherein each clip forms an abutment against which the following clip of the series abuts when pivoted to its open position.

4. A storage apparatus as defined in claim 3 wherein each clip forms a second pair of legs respectively substantially coplanar with said first pair of legs and protruding from said web away from said first pair of legs, the leg of said second pair which is coplanar with the narrower leg of said first pair forming said abutment.

5. A storage apparatus as defined in claim 4, wherein the two sets of coplanar legs form said opposite spaced and parallel main faces of said clip.

6. A storage apparatus as defined in claim 5 further including a post and a sleeve member surrounding said post and provided with spaced, parallel complementary hinge members formed at the periphery of said sleeve for releasably receiving complementary hinge members of said clips.

7. A storage apparatus as defined claim 5 further including a base member adapted to be secured to a support and having a male hinge member to which the female hinge member of the first clip of said series is releasably hinged.

8. A storage apparatus as defined in claim 7, further including a connector, said connector and each one of a pair of such base members having spaced, parallel, complementary hinge members by means of which said connector releasably connects said pair of base members.

9. A storage apparatus as defined in claim 7 further including a strip integrally forming several base members, spaced from one another and with their complementary hinge members being coaxial.

10. A storage apparatus as defined in claim 7 wherein said base member forms a clip capable of releasably holding a case in a holding plane parallel to the holding planes of the clips of said series when said clips are in folded position.

11. A storage apparatus as defined in claim 10, further including a connector, said connector and each one of a pair of such base members having spaced, parallel, complementary hinge members by means of which said connectors releasably connect said pair of base members.

12. A storage apparatus as defined in claim 10 further including a strip integrally forming several base members, spaced from one another and with their complementary hinge members being coaxial.

13. A storage apparatus as defined claim 5 further including a base member having two spaced, parallel female hinge members to which the male hinge member of the first clip of two series of such clips is releasably hinged, the pivotal axes of the pair of male and female hinge members of the clips of both series being progressively distant from each other for clips progressively distant from said base member.

14. A storage apparatus as defined in claim 13, further including a connector, said connector and each one of a pair of such base members having spaced, parallel, complementary hinge members by means of which said connector releasably connects said pair of base members.

15. A storage apparatus as defined in claim 13 further including a strip integrally forming several base members, spaced from one another and with their complementary hinge members being coaxial.

16. A storage apparatus as defined in claim 13 wherein said base member forms two oppositely facing interconnected clips, each interconnected clip capable of releasably holding a case in a holding plane parallel to the holding planes of the clips of one of said two series when said clips are in folded position, each interconnected clip having two legs, one leg wider than the other leg.

17. A storage apparatus as defined in claim 16 wherein the holding planes and wider legs of said interconnected clips are respectively normal to each other.

18. A storage apparatus as defined in claim 17, further including a connector, said connector and each one of a pair of such base members having spaced, parallel, complementary hinge members by means of which said connector releasably connects said pair of base members.

19. A storage apparatus as defined in claim 17 further including a strip integrally forming several base members, spaced from one another and with their complementary hinge members being coaxial.

20. A storage apparatus as defined in claim 16 wherein the holding planes and wider legs of said interconnected clips are respectively coplanar.

21. A storage apparatus as defined in claim 20, further including a connector, said connector and each one of a pair of such base members having spaced, parallel, complementary hinge members by means of which said connector releasably connects said pair of base members.

22. A storage apparatus as defined in claim 20 further including a strip integrally forming several base members, spaced from one another and with their complementary hinge members being coaxial.

23. A storage apparatus as defined in claim 16, further including a connector, said connector and each one of a pair of such base members having spaced, parallel, complementary hinge members by means of which said connector releasably connects said pair of base members.

24. A storage apparatus as defined in claim 16 further including a strip integrally forming several base members, spaced from one another and with their complementary hinge members being coaxial.

* * * * *